United States Patent [19]

Tateishi et al.

[11] Patent Number: 5,065,383

[45] Date of Patent: Nov. 12, 1991

[54] TRACKING SERVO SYSTEM ADAPTED TO OPERATE WITH VARIABLE TRACK PITCH

[75] Inventors: Kiyoshi Tateishi; Haruyasu Sakata, both of Tokorozawa, Japan

[73] Assignee: Pioneer Electronic Corporation, Tokyo, Japan

[21] Appl. No.: 334,189

[22] Filed: Apr. 6, 1989

[30] Foreign Application Priority Data

Sep. 16, 1988 [JP] Japan .................................. 63-231894

[51] Int. Cl.⁵ .............................................. G11B 7/95
[52] U.S. Cl. .................................... 369/44.28; 369/30; 358/907
[58] Field of Search .............. 369/44.28, 44.29, 44.35, 369/124, 158, 54, 32; 358/907, 342; 250/202

[56] References Cited

U.S. PATENT DOCUMENTS

4,598,394 7/1986 Nonaka ........................... 369/44.28
4,817,073 3/1989 Suzuki ............................ 369/44.28

Primary Examiner—Roy N. Envall, Jr.
Assistant Examiner—Thang V. Tran
Attorney, Agent, or Firm—Foley & Lardner

[57] ABSTRACT

In a tracking servo system for use in a disc player having a pickup, for playing an information recording disc having a recording track, the peak value of the tracking error signal obtained during a track jump operation is detected, and at least one of the pulse width and the pulse height of the deceleration pulse for the jump operation is varied in response to the detected peak value. With this feature, an appropriate control amount for the track jump operation corresponding to the track pitch is obtained even if there is a change in the track pitch.

6 Claims, 5 Drawing Sheets

TRACKING SERVO SYSTEM ADAPTED TO OPERATE WITH VARIABLE TRACK PITCH

BACKGROUND OF THE INVENTION

1. Field of the Invention

The present invention relates to a tracking servo system for use in an information recording disc playing apparatus, and more specifically relates to a tracking servo system performing a jump operation for jumping recording tracks on the disc.

2. Description of Background Information

With apparatus for playing an information recording disc (simply referred to as "disc" hereinafter) such as a video disc or a digital audio disc, it is necessary to use a tracking servo system for controlling the position of the information reading spot of the pickup so that it accurately follows the recording track irrespective of the eccentricity of the disc, for example.

This tracking servo system constitutes a so-called closed loop system which generates a tracking error signal corresponding to the amount of deviation of the information reading light spot with respect to the recording track of the disc in a disc's radial direction, and performs position control relative to the recording track by driving an actuator for moving the information reading spot in the radial direction in response to the tracking error signal. Furthermore, in the case of such a servo system, the servo loop is opened during the so-called jump operation for jumping recording tracks, and an acceleration pulse is applied to the actuator while the servo loop is opened, a deceleration pulse is then applied to the actuator at a predetermined time in the jump operation, and afterwards the servo loop is made closed at an appropriate time so as to pull-in (or lock-in) the servo loop.

In this track jump control, the pulse width and the pulse height of the acceleration and deceleration pulses are determined according to the pitch of the recording tracks, since the track pitch is generally equal to a standard value. However, in some cases there are nonstandard discs in which a sudden change in the track pitch can occur. If the track jump operation is performed while playing a nonstandard disc, the acceleration would become excessive, for example, if an acceleration pulse having the normal pulse width and the normal pulse height is applied at a position where the track pitch is reduced suddenly. In such a case, the amount of jump of the information reading point becomes excessive with respect to the track pitch, and it renders the jump operation unstable.

OBJECT AND SUMMARY OF THE INVENTION

An object of the present invention is therefore to provide a tracking servo system which is capable of always performing the jump operation in a stable manner irrespective of the change in the pitch of tracks formed on the disc.

A tracking servo system according to the present invention is constructed to perform a control operation such that an acceleration pulse is applied to a drive unit for moving the information reading spot of the pickup in the direction of a disc radius when the jump command is generated., a deceleration pulse is applied at a predetermined time while the jump operation is being performed, a peak value of the tracking error signal obtained during the track jump operation is detected, and one of the pulse width and the pulse height of the deceleration pulse is varied in response to the detected peak value.

DETAILED DESCRIPTION OF A PREFERRED EMBODIMENT

The embodiment of the present invention will be discussed with reference to the accompanying drawings hereinafter.

Figure 1:
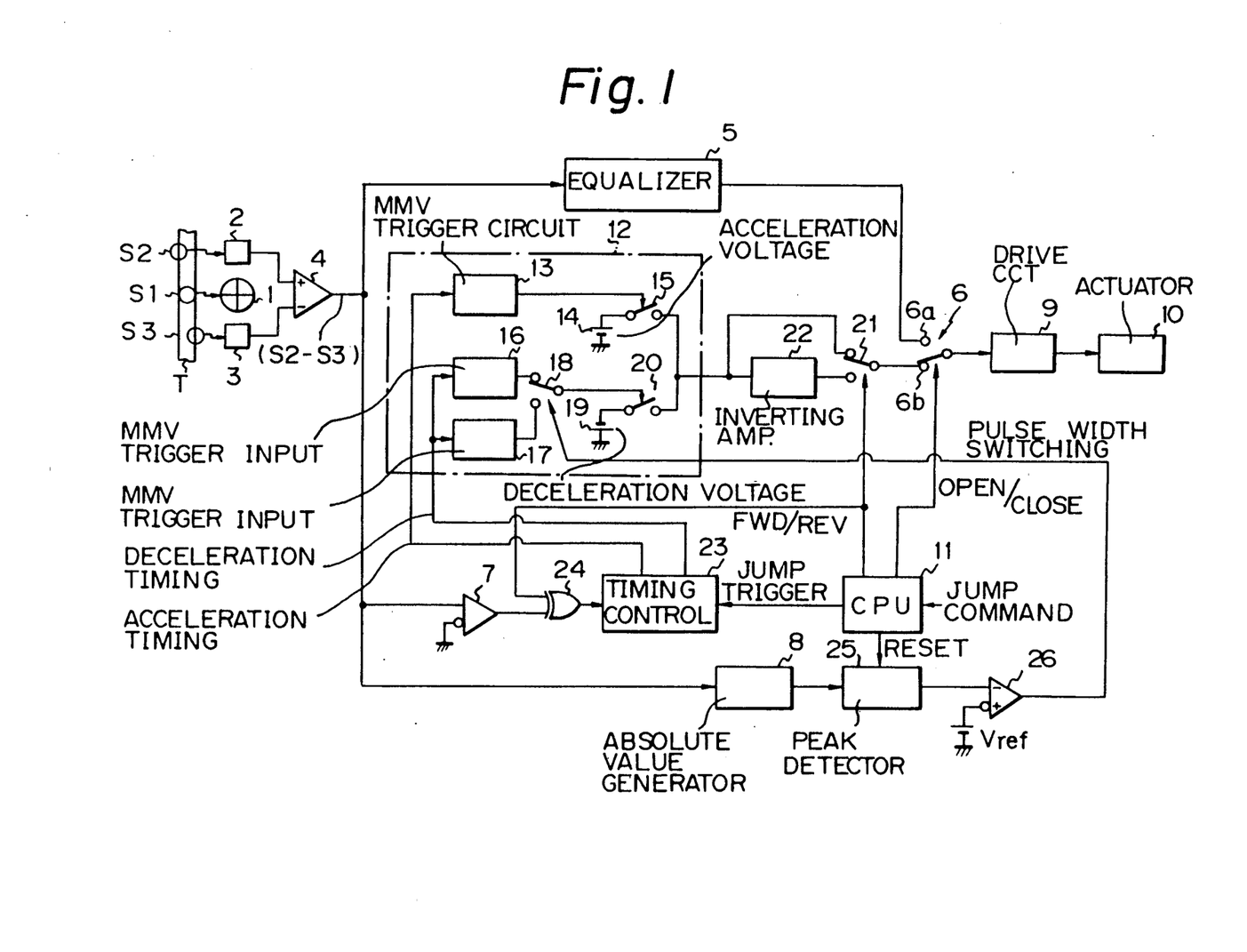
FIG. 1 is a block diagram showing an embodiment of the present invention.

FIG. 1 is a block diagram showing the embodiment of the tracking servo system according to the present invention. As shown, three beam spots obtained by converging a laser beam, that is, a recorded information reading spot S1, and a pair of spots S2 and S3 for detecting tracking information which precede or follow the spot S1 are irradiated from a pickup (not illustrated) onto a recording track T of a disc in a positional relationship as illustrated. Reflection lights from these beam spots are received by photo-electric transducers 1 through 3 which are incorporated in the pickup.

Figures 2A, 2B, 2C:
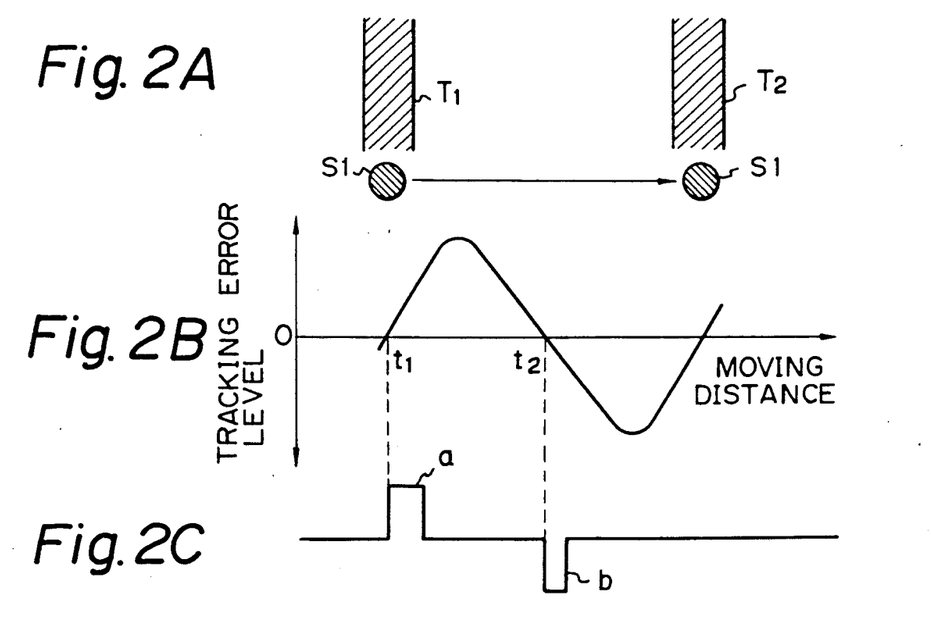
FIGS. 2A through 2C are diagrams showing the relationship among the moving position of the information reading spot relative to the recording track, the tracking error signal, and acceleration and deceleration pulses.

The photo-electric transducer 1 is made up of four light receiving elements which are arranged to be bounded by two lines crossing at right angles with each other, and are independent from each other. A sum total the output signals from these light receiving elements constitutes a read-out RF (radio frequency) signal. On the other hand, output signals of the pair of photoelectric transducers 2 and 3 are supplied to a differential amplifier 4 in which a difference between two output signals is derived, and the differential output signal (S2-S3) constitutes a tracking error signal. When the beam spots S1 through S3 are moved, by a jump operation, from one recording track T1 to the adjacent recording track T2 as illustrated in FIG. 2A, the tracking error signal (S2-S3) will have the sinusoidal waveform as illustrated in FIG. 2B, whose level is proportional to the amount of deviation of the information reading light spot S1 from the recording track T, and whose zero-crossing point corresponds to the position of the center of the recording track and the position of the central point between two adjacent tracks T1 and T2.

The tracking error signal is treated by an equalizer 5 for compensating for its frequency characteristic, and is in turn supplied to a closed contact 6a of a loop switch 6, and also supplied to a zero-crossing comparator 7 and an absolute value generation circuit 8. The output signal of the loop switch 6 is supplied to an actuator 10 of the pickup via a drive circuit 9. This actuator 10 is operative to move the information reading spot S1 in a direction of the disc radius so that the spot S1 accurately follows the recording track T. The circuits and elements described above together constitute a tracking servo loop.

The switch position of the loop switch 6 is controlled by means of a CPU (central processing unit) 11, and the servo loop is made closed when the switch 10 is operated to its closed contact 6a. In the open-loop state in which the loop switch 6 is operated at its open contact 6b, a jump pulse a and a break pulse b which are opposite in polarity are issued from a pulse generator circuit 12, respectively at appropriate times t1 and t2. The jump operation is performed by applying these pulses to the actuator 10.

The pulse generator circuit 12 is constituted by an acceleration pulse generating part for generating an acceleration pulse having a predetermined pulse width and a predetermined pulse height, and a deceleration pulse generating part for generating deceleration pulses of negative polarity having different pulse widths and having a predetermined pulse height, for example. The acceleration pulse generating part is made up of a monostable multivibrator 13 (referred to as MMV hereinafter) for determining the pulse width of the acceleration pulse, an acceleration voltage source 14 for determining the pulse height of the acceleration pulse, and a switching circuit 15 for outputting the acceleration voltage only during the presence of the pulse generated by the MMV 13. The degree of acceleration is determined by the pulse width and the pulse height of this acceleration pulse, and this degree of acceleration is determined corresponding to the track pitch within the standard track. On the other hand, the deceleration pulse generating part is made up of two MMVs 16 and 17 for determining two pulse width values of the deceleration pulse, a selector switch 18 for selecting one of output pulses of the MMVs 16 and 17, a deceleration voltage source 19 for determining the pulse height of the deceleration pulse, and a switching circuit 20 for outputting the deceleration voltage only during the presence of the pulse signal generated by the MMV 16 or the MMV 17.

In the deceleration pulse generating system, the MMV 16 is designed to generate an output pulse whose pulse width is narrower than that of the output pulse of the MMV 17, and the output pulse signal of the MMV 16 is normally selected by the selector switch 18. The degree of braking (deceleration) is determined by the pulse width and the pulse height of this deceleration pulse, and the degree of braking by the output pulse of the MMV 16 is determined according to the track pitch within the standard track. On the other hand, the pulse width of the output pulse of the MMV 17 is determined so that the degree of braking obtained by this output pulse becomes 4/3 times the normal value, for example.

The acceleration and deceleration pulses outputted by the pulse generator circuit 12 are supplied to the open contact 6b of the loop switch 6 directly through the change-over switch 21 during a jump operation in the FWD (forward) direction, and are supplied to the open contacts 6b via the changeover switch 21 after the polarity is inverted by an inverting amplifier 22 having a gain of 0 dB during a jump operation in the REV (reverse) direction. The switch control of the change-over switch 21 is performed by the CPU 11. On the other hand, the times of the generation of the acceleration and deceleration pulses re controlled by a timing control circuit 23. When a jump trigger is outputted from the CPU 11 in response to a jump command, the timing control circuit 23 generates an acceleration timing signal which in turn is used as a trigger input signal for the MMV 13 in the acceleration pulse generating part. The timing control circuit 23 also generates a deceleration timing signal at a predetermined time during the jump operation which will be described later, and the deceleration timing signal is used as the trigger input signal for the MMVs 16 and 17 in the deceleration pulse generating part.

The zero-crossing comparator circuit 7 is configured to detect the time of zero-crossing of the tracking error signal changing from positive to negative during the jump operation as illustrated in FIG. 2B. The detection output signal of the zero-crossing comparator 7 is supplied to one input terminal of an exclusive OR circuit 24 which receives, at its other input terminal, a FWD/REV change-over signal outputted by the CPU 11. The output signal of the exclusive OR circuit 24 is supplied to the timing control circuit 23 and is used as a trigger signal for the generation of the deceleration timing signal which was described before.

The tracking error signal, which is converted to an absolute value signal by means of the absolute value generating circuit 8, is supplied to a peak detector circuit 25. This peak detector circuit 25 is adapted for detecting the peak value of the tracking error signal within a period from the time of start of the acceleration to the zero-crossing point of the off-track position in the case of one-track jump operation, and for detecting the peak value of the tracking error signal within a period in which the information reading spot moves from an on-track position to an off-track position immediately before the end of the track jump operation, in the case of a multi-track jump operation. The timing control for this detection operation is performed by the CPU 11.

The detection signal whose level corresponds to the peak value detected by the peak detector circuit 25 is compared with a reference value Vref in the peak comparator 26. This reference value Vref is set, for example, at 60% of a level corresponding to the peak value of the tracking error signal which is normally obtained when the jump operation is performed on a disc having a standard track pitch. With this feature, a comparison signal is generated from the peak comparator 26 when the peak value of the tracking error signal obtained during a jump operation is below 60% of the normal peak value. This comparison output signal is used as a change-over control signal for the selector switch 18 in the deceleration pulse generating part of the pulse generating circuit 12.

The operation of each circuit of the structure explained above in the one-track jump operation, for example, will be explained hereinafter.

Figure 3:
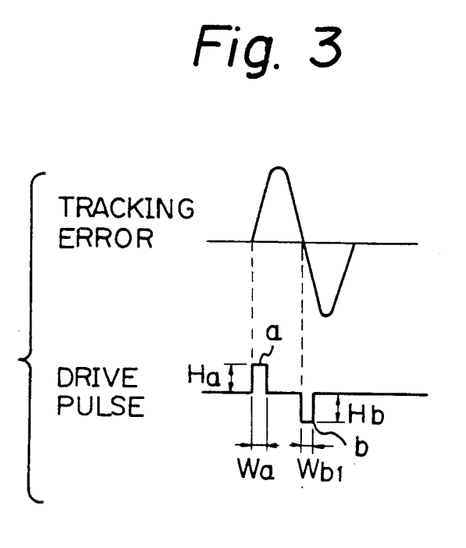
FIG. 3 is a diagram showing waveforms of the tracking error signal and the acceleration and deceleration pulses during a jump operation over recording tracks having a normal track pitch.

When a jump command is generated, the jump trigger signal is outputted from the CPU 11 and supplied to the timing control circuit 23. In response to this jump trigger signal, the timing control circuit 23 generates the acceleration timing signal. In the acceleration pulse generating part of the pulse generating circuit 12, the acceleration pulse a having a pulse width Wa and a pulse height Ha corresponding to the standard track pitch, as illustrated in FIG. 3, is generated in response to the acceleration timing signal, and the acceleration pulse a is supplied to the drive circuit 9 via the loop switch 6. As a result of this operation, the jump operation is started so that the information reading spot S1 is moved with acceleration from one recording track T1 to another recording track T2 adjacent thereto, as illustrated in FIG. 2A.

Then, when the zero-crossing in the off-track position is detected by the zero-crossing comparator 7, the deceleration timing signal is generated in the timing control circuit 23 in response to the detection signal. In this jump operation, the peak value of the tracking error signal in a period from the time t1 of the start of the acceleration to the time t2 of the zero-crossing in the off-track position is detected by the peak detector circuit 25, and in turn compared with the reference value Vref in the peak comparator 26. If the peak value has reached the reference value Vref, it means that the track pitch of the disc is within the standard or near to the standard pitch, the switch control of the selector switch 18 in the deceleration pulse generating part in response to the comparison output signal of the peak comparator 26 will not be performed, so that the selector switch 18 maintains its switch position for selecting the output pulse signal of the MMV 16 having the smaller pulse width.

With this operation, the deceleration pulse b having the pulse width Wb1 and the pulse height Hb corresponding to the standard track pitch is generated in the deceleration pulse generating part at the time of zero-crossing, and the deceleration pulse b is applied to the drive circuit 9 via the loop switch 6.

Figure 4:
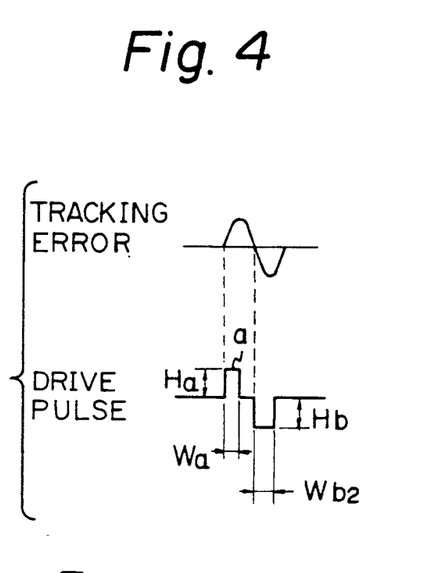
FIG. 4 is a diagram showing waveforms of the tracking error signal and the acceleration and deceleration pulses during a jump operation over recording tracks whose track pitch is smaller than the normal track pitch.

On the other hand, if for example the track jump operation is performed on a position where the track pitch is reduced suddenly, then it causes the reduction in the peak value of the tracking error signal in the period from the time t1 of the start of the acceleration to the time t2 of the zero-crossing in the off-track position. Thus, there is a correlation between the peak value and the track pitch. This peak value is detected by the peak detector 25 and compared with the reference value Vref at the peak comparator 26. If the peak value is below the reference value Vref (for example below 60% of the normal peak value), the selector switch 18 in the deceleration pulse generating part is switched over by the comparison output signal of the peak comparator 26, so that the output pulse signal of the MMV 17 having the wider pulse width is selected. As a result, a deceleration pulse b having the pulse width Wb2 which is wider than the pulse width Wb1 corresponding to the normal track pitch is generated in the deceleration pulse generating part, and applied to the drive circuit 9. By this change in the pulse width of the deceleration pulse b degree of the braking is increased as compared with the jump operation across the tracks with the standard track pitch. In addition, the amount of change in the pulse width (Wb2 - Wb1) of the deceleration pulse b is set so that the degree of the braking becomes 4/3 times the normal value, for example.

Figure 5:
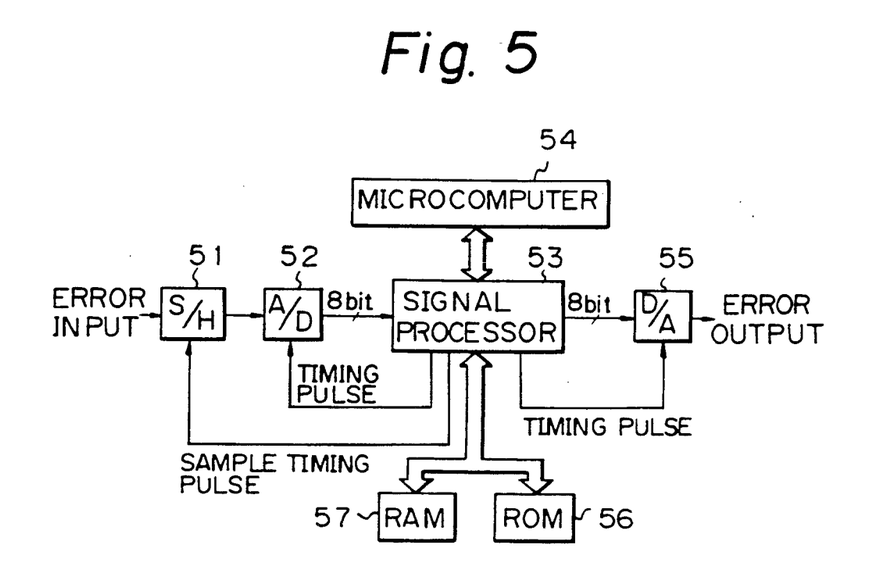
FIG. 5 is a block diagram showing a construction for performing the signal processing during the track jump operation by means of a signal processor in a software fashion.

FIG. 5 is a block diagram showing a construction in which the procedure of the signal processing in the track jump operation is performed by a signal processor in a soft-ware fashion. As shown in this figure, the input tracking error signal is sampled by means of a sample and hold circuit 51, and in turn is transformed into digital form by means of an A/D converter 52. Thus, the error signal is supplied to the signal processor 53 as 8-bit data, for example. The signal processor 53 is controlled by means of a microcomputer 54 so that it performs compensation of frequency characteristic of the tracking error signal, and signal processing such as the generation of the acceleration and deceleration pulses and the control of the pulse width during the jump operation. The 8-bit data D outputted from this signal processor 53 is converted to the analog form in a D/A converter 55, and in turn is used as the drive input signal the driving circuit 9 (see FIG. 1). From this signal processor 53, a sample timing pulse signal, an A/D conversion timing pulse signal, and a D/A conversion timing pulse signal are supplied to the sample and hold circuit 51, the A/D converting circuit 52, and to the D/A converting circuit 55, respectively. In a ROM 56, predetermined data were stored previously, and data obtained through the calculation operation are temporarily stored in a RAM 57.

Figure 6A:
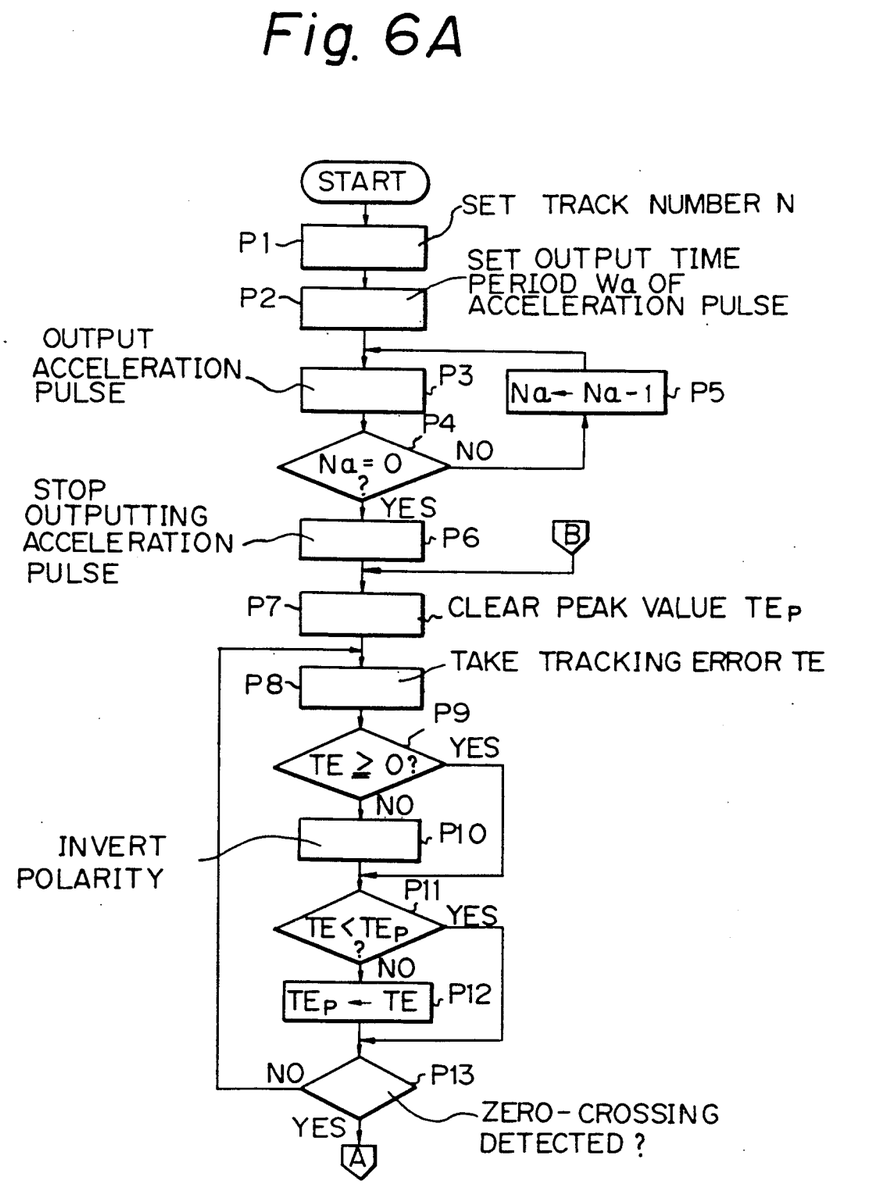
FIGS. 6A and 6B are flowcharts showing the procedure of acceleration and deceleration control during the track jump operation in the construction using the signal processor.
Figure 6B:
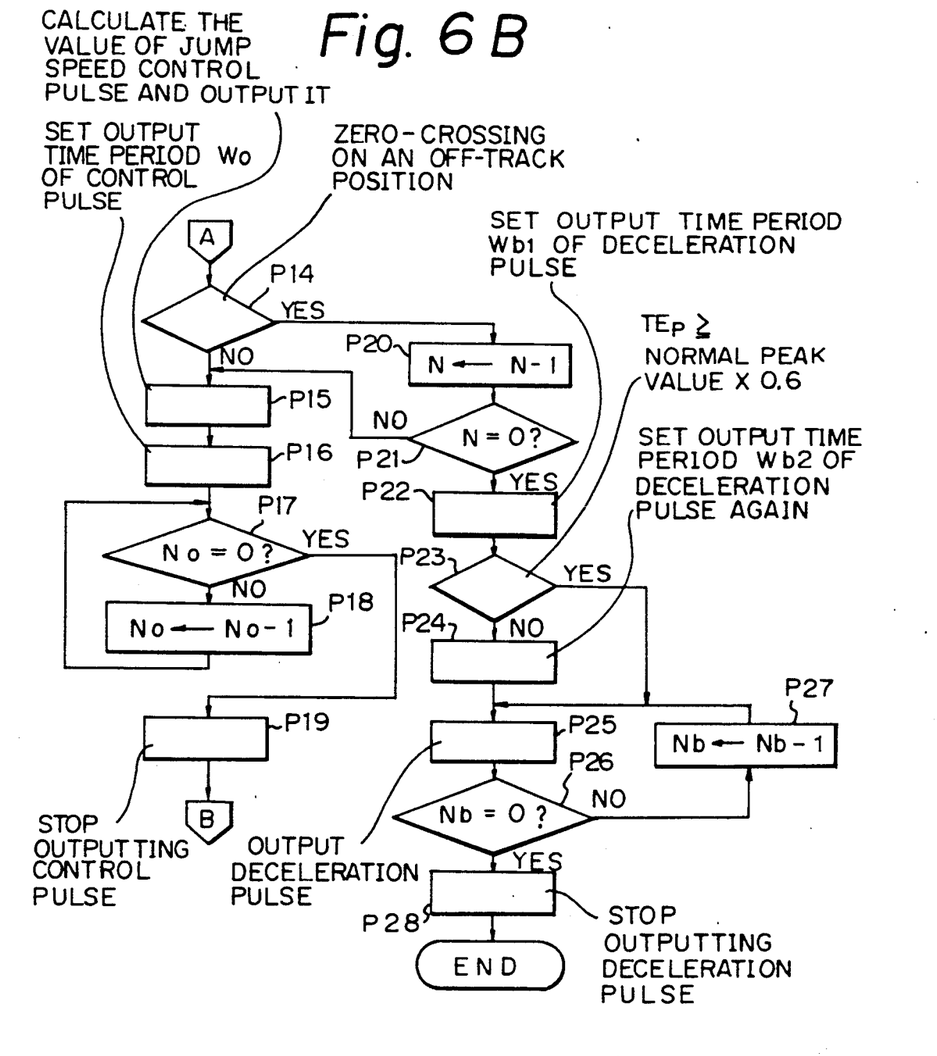

Referring to the flowchart of FIG. 6, the procedure the acceleration or deceleration control in the multi-track jump operation for example, when the signal processor 53 is employed, will be explained hereinafter.

In response to the jump command, the processor at first sets the number N of tracks to be jumped, in an internal counter 1 for counting the number of jumped tracks (step P1). Successively, the processor sets a value Na corresponding to the period for outputting the acceleration pulse, in an internal counter 2 (step P2). Subsequently, the processor starts the output of the acceleration pulse (step P3). Then, the processor judges whether or not the period Wa for outputting the acceleration pulse has elapsed, i.e. whether or not the count value Na of the counter 2 has reached 0 (step P4). If Na $\neq 0$, the processor continues the count down of the count value Na (step P5).

If Na$=0$, the processor stops the output of the acceleration pulse (step P6), subsequently clears the internal register for loading the peak value of the peak value TEp of the tracking error signal (step P7), and takes the A/D converted tracking error TE (step P8). Subsequently, the processor judges whether or not the tracking error TE taken has a positive polarity (step P9). If the polarity of the tracking error TE is negative, then the processor inverts the polarity of the tracking error TE (step P10). Through these operations, the absolute value of the tracking error TE is generated.

Subsequently, the processor compares the tracking error TE taken in step P8 with the peak value TEp of tracking error which has been loaded in the register (step P11). If TE<TEp, the peak value TEp is maintained as it is. On the other hand, if TE$\geq$TEp, the tracking error TE taken in step P8 is loaded in the register as a new peak value TEp (step P12). The peak value TEp is renewed in this way. Then, the processor detects the zero crossing of the tracking error TE (step P13). If the zero crossing point has not been reached, the processor goes back to step P8, to repeat the operations described above.

On the other hand, if the zero-crossing is detected, the processor judges whether or not the detected zero-crossing is a zero-crossing on an off-track position (step P14). This detection is, for example, performed by judging the direction of change (increase or decrease) in the tracking error TE with respect to the direction (forward direction or reverse direction) of the jump operation. If the detected zero-crossing is not the zero-crossing on the off-track position, the processor calculates the value of the jump speed control pulse and outputs the calculated value (step P15). Then the processor sets a value No corresponding to the output time period Wo of the control pulse in the internal counter 2 (step P16), and monitors the lapse of the output time period Wo through the operations in steps P17 and P18 in which whether or not the value No is equal to 0 is detected, and the value No is decreased by one if the answer is negative. After the lapse of the output time period, the output of the control pulse is stopped (in step P19), and the processor goes back to step P7, to repeat the operations described above.

If the detected zero-crossing is a zero-crossing on an on-track position, the processor counts down the jump track number N of the internal counter 1 by one (step P20). Subsequently, the processor judges whether or not N=0, that is, whether or not the jump operation is to be finished (step P21). If the jump operation is not to be finished, the processor proceeds to step P15. On the other hand, if the jump operation is to be finished, the processor sets a value Nb1 corresponding to the normal output time period Wb1 of the deceleration pulse in the internal counter 2 (step P22). Then, the processor detects whether or not the track pitch has changed greatly, by judging whether or not the peak value TEp of the tracking error loaded in the internal register is, for example, higher than 60% of the normal peak value (step P23). If there is a big change in the track pitch, the processor sets a value Nb2 corresponding to an output time period Wb2 longer than the normal output time period Wb1 of the deceleration pulse again in the internal counter 2 (step P24).

After setting the output time period Wb1 or Wb2 of the deceleration pulse, the processor issues the deceleration pulse (step P25), and monitors the lapse of the output time period Wb1 or Wb2 through steps P26 and P27 in the similar manner as in the steps P17 and P18. When the output time period Wb1 or Wb2 has elapsed, the processor stops issuing the deceleration pulse (step P28), to complete the acceleration and deceleration control of the jump operation.

As described in the foregoing, the peak value of the tracking error signal is detected for the tracking error signal in the period between the time point t1 of the start of acceleration and the time point t2 of the zero-crossing on the off-track position, in the case of the one-track jump operation. In the case of the multi-track jump operation, the peak value of the tracking error signal is detected for the tracking error signal in the period immediately before the end of the jump operation in which the pickup is moved from an on-track position to an off-track position. If the peak value is less than 60%, for example, of the normal peak value, the degree of braking is changed to be 4/3 times the normal degree. With this operation, the jump amount corresponding to the actual track pitch is attained even if the jump operation is performed in a position in which the track pitch is reduced suddenly. Thus, the track jump operation always is performed in a very stable manner irrespective of the variation of track pitch.

In the embodiment of the present invention described above, the degree of braking is varied by changing the pulse width of the deceleration pulse. However, it is also possible to vary the degree of braking by changing the pulse height of the deceleration pulse or by changing the pulse width and pulse height of the deceleration pulse at the same time.

Furthermore, although the normal peak value is determined by the predetermined reference value Vref supplied to the comparator 26 in the embodiment described above, the reference value Vref can be determined by a different way such that the pickup is once moved across the whole recording area of the disc, the absolute value of the tracking error signal obtained through this movement is averaged, and the average value is further treated by an arithmetic operation to provide the reference value Vref. This is based on the following situation. Although the total number of tracks which the pickup traverses in the disc's radial direction is as many as 54,000, the number of tracks having track pitches outside the standard is very small. This means that the level obtained by averaging the absolute values of the tracking error is not practically not affected by the tracks having track pitches outside the standard. Therefore, with this method, it is possible to compensate for variations of the peak value which may be caused by the difference in reflectivity among discs or the difference in performance of photo detectors.

In the embodiment described above, the braking amount is changed between two levels in response to the detection of a narrow track pitch. However, it is also possible to change the braking amount when it is detected that the track pitch is broadened. Moreover, it is also possible to arrange that the amount of braking is changed gradually instead of changing between two levels. The essential point is that the degree of braking can be controlled in response to the peak value of the tracking error signal obtained during the jump operation.

As explained in the foregoing, in the tracking servo system according to the present invention, the control operation is performed so that the peak value of the tracking error signal obtained during a jump operation is detected, and one of the pulse width or the pulse height of the deceleration pulse is varied in response to the detected peak value With this feature, an appropriate control amount of jump operation with respect to the track pitch is always attained irrespective of the change in the track pitch of the disc. Thus, the jump operation is always performed stable manner.

What is claimed is:

1. A tracking servo system for use in a disc player having a pickup, for playing an information recording disc having a recording track, said tracking servo system, including a servo loop, comprising means for generating a tracking error signal corresponding to an amount of deviation, in a radial direction of said disc, of an information reading spot of said pickup with respect to said recording track, and drive means for shifting said information reading spot in said radial direction of said disc in response to said tracking error signal, said servo loop opening in response to a jump command and closing upon completion of a jump operation having a given period, said tracking servo system further comprising:
    pulse producing means for applying to said drive means an acceleration pulse when said jump command is generated and a deceleration pulse at a predetermined time in said period of said jump operation;
    peak value detecting means for detecting a peak value of said tracking error signal obtained during said jump operation; and
    control means for performing a control operation upon said pulse producing means for varying at least one of a pulse width and pulse height of said deceleration pulse in response to said peak value detected by said peak value detecting means.

2. A tracking servo system as claimed in claim 1, wherein said peak value detecting means is operative to detect said peak value of the tracking error signal in a period between a start time of an acceleration of said pickup and a time when a zero-crossing of said tracking error signal in an off-track position is detected, in the case of a one-track jump operation.

3. A tracking servo system as claimed in claim 1, wherein said peak value detecting means is operative to detect said peak value of the tracking error signal in a period in which said information reading spot moves from an on-track position to an off-track position immediately before an end of a jump operation, in case of a multi-track jump operation.

4. A method for controlling a tracking servo system in a disc player having a pickup, for playing an information recording disc having a recording track, said tracking servo system including a servo loop which comprises means for generating a tracking error signal corresponding to an amount of deviation, in a radial direction of said disc, of an information reading spot of said pickup with respect to said recording track, and drive means for shifting said information reading spot in said radial direction of said disc in response to said tracking error signal, said servo loop opening in response to a jump command and closing upon completion of a jump operation having a given period, said control method comprising the steps of:

producing an acceleration pulse and applying said acceleration pulse to said drive means when said jump command is generated and a deceleration pulse at a predetermined time in said period of said jump operation;

detecting a peak value of said tracking error signal obtained during said jump operation; and performing a control operation upon said pulse producing step for varying at least one of a pulse width and a pulse height of said deceleration pulse in response to said peak value detected by said peak value detecting step.

5. A control method as claimed in claim 4, wherein said step of detecting a peak value comprises detecting said peak value of said tracking error signal in a period between a start time of acceleration of said pickup and a time when a zero-crossing of said tracking error signal in an off-track position is detected, in case of a one-track jump operation.

6. A control method as claimed in claim 4, wherein said step of detecting a peak value comprises detecting said peak value of said tracking error signal in a period in which said information reading spot moves from an on-track position to an off-track position immediately before an end of a jump operation, in case of a multi-track jump operation.

* * * * *